United States Patent [19]

Fujimoto

[11] Patent Number: 4,751,591
[45] Date of Patent: Jun. 14, 1988

[54] DIGITAL SIGNAL PROCESSING SYSTEM AND METHOD

[75] Inventor: Yoshihiro Fujimoto, Kanagawa, Japan

[73] Assignee: Sony Corporation, Tokyo, Japan

[21] Appl. No.: 797,499

[22] Filed: Nov. 13, 1985

[30] Foreign Application Priority Data

Nov. 16, 1984 [JP] Japan .................................. 59-240524

[51] Int. Cl.⁴ ........................... G11B 5/09; G11B 5/02
[52] U.S. Cl. ........................................... 360/46; 360/67
[58] Field of Search ...................... 369/59; 360/46, 51, 360/67

[56] References Cited

U.S. PATENT DOCUMENTS

| 3,846,829 | 11/1974 | Lin ........................................ 360/46 |
| 4,495,529 | 1/1985 | Gustafson ............................ 360/46 |
| 4,564,870 | 1/1986 | Kiramura ............................. 360/46 |

*Primary Examiner*—Vincent P. Canney
*Attorney, Agent, or Firm*—Lewis H. Eslinger

[57] ABSTRACT

A digital signal processing system monitors variation of the signal level of a reproduced signal and also monitors variation of the differentiated signal level. The system generates a read-enable pulse when the reproduced signal level rises or drops across a predetermined threshold level and this is followed by a zero-crossing in the differentiated signal level.

4 Claims, 2 Drawing Sheets

DIGITAL SIGNAL PROCESSING SYSTEM AND METHOD

BACKGROUND OF THE INVENTION

The present invention relates generally to a digital signal processing system and method especially adapted for reproducing and wave-shaping digital signals. More specifically, the invention relates to generation of a read-enable pulse for reproducing digital signals recorded on a magnetic medium, such as a magnetic tape, a magnetic disk and so forth.

As is well known, in digital signal recording, data encoded into the digital signal is recorded on a magnetic recording medium in the form of binary data by way of residual magnetic induction. In this case, it is not necessary to superimposed an AC bias on the recording signal.

It is also a well known technique to generate a read-enable pulse which orders reproduction of recorded digital information, differentiate the reproduced signal to derive a differentiated signal, and then detect the zero-crossing of the differentiated signal. In this case, the zero-crossing of the differentiated signal has to represent a peak in the reproduced signal. Therefore, by detecting every occurence of zero-crossing in the differentiated signal, the read-enable pulses can be generated synchronously with the peaks of the reproduced signal.

This conventional process for generating read-enable pulses works as long as the pulse intervals of the digital signal remain essentially constant and short enough that the analog reproduced signal is always changing due to magnetic reversals on the medium. However, in practice, the intervals between reversals vary significantly. When the pulse interval is significantly prolonged, the reproduced signal level tends to remain constant at approximately zero for a noticeable period of time before continuing toward the next amplitude peak, this waveform being commonly known as a "shoulder". When a shoulder appears in the reproduced signal, a saddle-point extremum with a zero amplitude appears in the differentiated signal saddle. This peak at the zero-amplitude level may be mistaken for a zero-crossing; this would lead to generation of a read-enable pulse at a timing that does not coincide with any of the peaks in the reproduced signal. This commonly causes errors in reading recorded data.

The probability of read error is especially high when the reproduced signal is noisy, in particular near shoulders.

This tendency can be ameliorated by applying MFM techniques to base data in order to hold the pulse intervals of the digital signal essentially constant. However, even in this case, variation among pulse intervals occurs due to reproduction velocity fluctuations when the recording medium is a magnetic disk. Therefore, this would not be sufficient to prevent read errors.

SUMMARY OF THE INVENTION

Therefore, it is an object of the invention to provide a signal processing system which can detect the peaks of a reproduced signal accurately and generate read-enable pulses in exact correspondence to the peaks in the reproduced signal.

In order to accomplish the aforementioned and other objects, a digital signal processing system, according to the present invention, monitors variation of the signal level of a reproduced signal and also monitors variation of the differentiated signal level. The system generates a read-enable pulse when the reproduced signal level rises or drops across a predetermined threshold level and this is followed by a zero-crossing in the differentiated signal level.

By this process, influence of shoulders which may appear in the reproduced signal can be eliminated so that the read-enable pulses can be generated in exact synchronization with the peaks in the reproduced signal.

According to one aspect of the invention, a digital signal processing system for generating read-enable pulses comprises a recording medium for storing digital data, first means for reproducing a first signal representative of the stored digital data and which has a signal level varying according to the stored digital data, second means for monitoring the first signal and upon detecting a peak in the first signal, producing a read-enable pulse, and third means, cooperative with the second means, for monitoring the first signal level and enabling the second means to produce the read-enable pulses every time the first signal level acrosses a predetermined threshold level, the third means being responsive to the second means producing the read-enable pulse to subsequently disable the second means until the next time the first signal level crosses the predetermined threshold level.

The second means comprises a differentiation circuit for producing a second signal indicative of the differentiated value of the first signal and a first detector means which produces a read-enable pulse upon detecting zero-crossing of the second signal. The first detector means is enabled and disabled by the third means.

The third means comprises a second detector means having a second comparator continuously comparing the first signal level with the predetermined threshold level and enabling the second means to produce the read-enable pulse when the first detector means detects zero-crossing of the second signal. The third means is disabled when the second means producing the read-enable signal until the second comparator detects that the first signal level has again crossed the predetermined threshold level. The predetermined threshold level comprises a first positive threshold level and a second negative threshold level, and the second comparator switches its output level between HIGH and LOW levels each time the first signal level moves outside the range defined by the first and second threshold levels.

The second detector further comprises an enable signal generator for producing an enable signal enabling the second means at every occurence of switching of the second comparator output level. The first detector comprises a first comparator which switches its output level between HIGH and LOW levels at every occurrence of positive-going and negative-going zero-crossings of the second signal, and wherein the second means produces the read-enable pulse in response to every occurence of switching of the first comparator output in the presence of the enable signal from the third means. The enable signal generator comprises a first enable signal generator responsive to switching of the second comparator output from LOW level to HIGH level to produce the enable signal, and a second enabling signal generator responsive to switching of the second comparator output from HIGH level to LOW level to produce the enable signal, and wherein the enable signal from one of the first and second enable signal generators is transmitted to the second means through a second OR gate.

The first detector further comprises a read-enable pulse generator, a first trigger signal generator responsive to switching of the first comparator output from LOW level to HIGH level to produce a trigger signal which triggers the read-enable pulse generator to produce the read-enable pulse, and a second trigger signal generator responsive to switching of the first comparator output from HIGH level to LOW level to produce the trigger signal, and wherein the trigger signal from one of the first and second trigger signal generators is transmitted to the read-enable pulse generator through a first OR gate.

The read-enable pulse generator includes a disable signal generator for disabling the first and second enable signal generators in the presence of a read-enable pulse.

According to an other aspect of the invention, a method for producing a read-enable signal for a digital signal processing system comprises the steps of:

reproducing a recorded digital data in the form of first signal having a signal level varying in accordance with reproduced digital data values;

monitoring the first signal level and producing a second signal when the first signal level acrosses a predetermined threshold level;

differentiating the first signal value to derive a third signal; and monitoring variation of the third signal and produce the read-enable signal when zero-crossing of the third signal is detected in the presence of the second signal.

The step of monitoring the third signal includes interrupting production of the second signal in response to production of the read-enable signal.

The step of monitoring the first signal level including comparing the first signal level with a first, positive threshold and producing the second signal in response to increase of the first signal level beyond the first threshold level, and comparing the first signal level with a second, negative threshold level and producing the second signal in response to decrease of the first signal level below the second threshold level.

The step of monitoring the third signal includes producing the read-enable signal upon detecting positive-going zero-crossing of the third signal and producing the read-enable signal upon detecting of negative-going zero-crossing of the third signal.

BRIEF DESCRIPTION OF THE DRAWINGS

The present invention will be understood more fully from the detailed description given herebelow and from the accompanying drawings of the preferred embodiment of the invention, which should not be taken to limit the invention to the specific embodiment, but are for explanation and understanding only.

In the drawings.

DESCRIPTION OF THE PREFERRED EMBODIMENT

Figure 1:
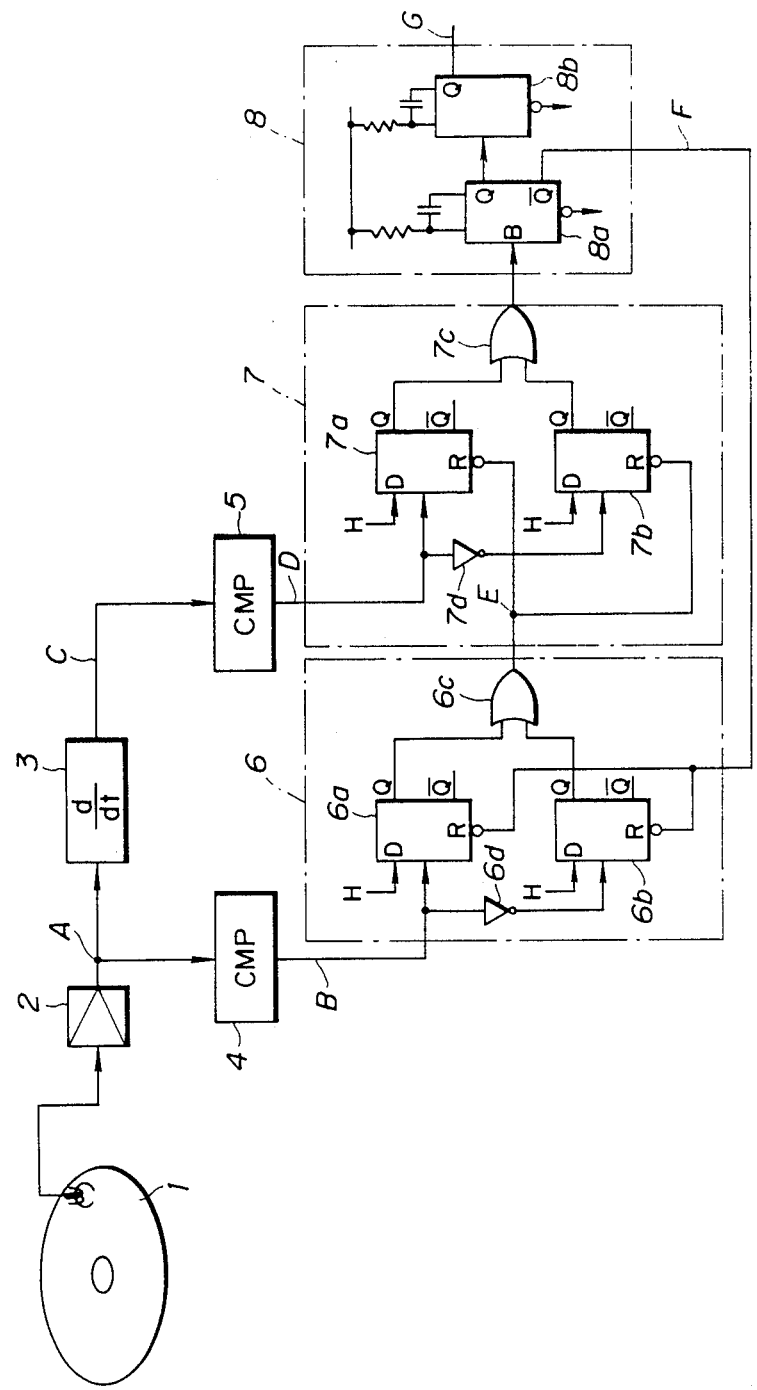
FIG. 1 is a block diagram of the preferred embodiment of a digital signal processing system according to the present invention.

Referring now to the drawings, particularly to FIG. 1, the preferred embodiment of the digital signal processing system includes a magnetic disk 1 serving as a magnetic recording medium. A magnetic head 1a picks up data recording on the magnetic disk 1. The magnetic head 1a produces a signal representative of the read data, which signal will be referred to hereafter as "reproduced signal A". The reproduced signal A is fed to a differentiation circuit 3 and a hysteresis comparator 4. The hysteresis comparator 4 has first and second threshold levels $Th_1$ and $Th_2$. The first and second threshold levels $Th_1$ and $Th_2$ are of opposite sign but have the same absolute values which are selected to be sufficiently far from the zero level of the reproduced signal A to eliminate the influence of shoulders, as explained below.

The differentiation circuit 3 outputs a signal representative of the differentiated value, which signal will be hereafter referred to as "differentiated signal C". The differentiated signal C is sent to a zero-crossing comparator 5.

The hysteresis comparator 4 outputs a comparator signal B to an edge-detecting circuit 6. The level of the comparator signal B reverses between HIGH and LOW each time the reproduced signal A level raises or drops outside of the range defined by the threshold levels $Th_1$ and $Th_2$. The edge-detecting circuit 6 comprises a pair of D-flip-flops 6a and 6b which receive the comparator signal B. The edge-detecting circuit 6 also comprises an OR gate 6c and an inverter 6d. The inverter 6d is interposed between the hysteresis comparator 4 and the D-flip-flop 6b, whereby it sends the inverted comparator signal B to the latter.

In addition, the zero-crossing comparator 5 sends a comparator signal D to another edge-detecting circuit 7. The comparator signal D varies between HIGH and LOW levels. Specifically, the comparator signal D is HIGH while the amplitude of the differentiated signal B is positive and is LOW level while the amplitude of the differentiated signal B is negative. Similarly to the first edge-detecting circuit 6, the edge-detecting circuit 7 comprises a pair of D-flip-flops 7a and 7b, an OR gate 7c and an inverter 7d. The inverter 7d is interposed between the zero-crossing comparator 5 and the D-flip-flop 7b. The reset terminals of the D-flip-flops 7a and 7b are connected for input from the OR gate 6c. Therefore, the D-flip-flops 7a and 7b are reset by HIGH level outputs from the OR gate 6c.

The OR gate 7c is connected to supply a gated output to a monostable multivibrator 8a in a pulse generator circuit 8. The monostable multivibrator 8a has an inverted output terminal connected to the reset terminal of the D-flip-flops 6a and 6b. The non-inverted output terminal of the monostable multivibrator 8a is connected to another monostable multivibrator 8b which serves to generate the read-enable pulse G.

In operation, the hysteresis comparator 4 continuously compares the signal level of the reproduced signal A with the threshold levels $Th_1$ and $Th_2$. At a time $t_1$, the reproduced signal level A increases across the upper threshold level $Th_1$. The signal level of the hysteresis comparator 4 then turns from LOW level to HIGH level. The comparator signal level B remains HIGH until the reproduced signal level A drops below the lower threshold level $Th_2$. The HIGH level comparator signal B sets the D-flip-flop 6a so that a HIGH-level set signal is sent to the OR gate 6c. At this time, the input level to the D-flip-flop 6b remains LOW. As a result, the utput signal E of the OR gate 6c goes HIGH to turn the input levels at the reset terminals of the D-flip-flops 7a and 7b LOW. Therefore, the D-flip-flops 7a and 7b are released from their reset states, i.e. they are enabled.

Under these conditions, the D-flip-flops 7a and 7b are responsive to HIGH-level inputs to output HIGH-level set signals. At a time $t_2$, the differentiated signal C drops across the zero level, so that the signal level of the zero-crossing comparator 5 goes from HIGH to LOW. As a result, a HIGH-level signal is input to the D-flip-flop 7b through the inverter 7d. Therefore, the D-flip-flop 7b outputs a HIGH-level set signal to the OR gate 7c. At the same time, the input level to the D-flip-flop 7a remains LOW. Therefore, the output level of the D-flip-flop 7a remains LOW. In response to the HIGH-level set signal from the D-flip-flop 7b, a HIGH-level signal is transmitted to the monostable multivibrator 8a by the OR gate 7c. As a result, the output level F at the inverted output terminal of the monostable multivibrator 8b goes LOW. Therefore, the input level at the reset terminals of the D-flip-flops 6a and 6b go HIGH to reset the latter at the time $t_2$. On the other hand, at the same time, the output level at the non-inverted outpt terminal of the monostable multivibrator 8a goes HIGH to trigger the monostable multivibrator 8b. Therefore, the output G of the monostable multivibrator 8b, which serves as the read-enable pulse, goes HIGH.

At a time $t_3$, the reproduced signal level A drops below the lower threshold level $Th_2$. Thus, the output level of the hysteresis comparator 4 goes from HIGH to LOW. The comparator signal level B remains LOW until the reproduced signal level A rises above the upper threshold level $Th_1$. The LOW-level comparator signal B is sent to the D-flip-flop 6a and through the inverter 6d to the D-flip-flop 6b. This LOW-level input holds the D-flip-flop 6a in its reset state. At this time, the input level for the D-flip-flop 6b goes HIGH, thus setting the latter. Therefore, the D-flip-flop 6b outputs a HIGH-level set signal to the OR gate 6c. As a result, the output level of the OR gate 6c goes HIGH to turn the input levels a the reset terminals of the D-flip-flops 7a and 7b LOW. Therefore, the D-flip-flops 7a and 7b are released from their reset states.

Under these conditions, the D-flip-flops 7a and 7b are responsive to HIGH-level input at their reset input terminals to be released from the reset state. At a time $t_4$, the differentiated signal C rises across the zero-level. Then, the signal level of the zero-crossing comparator 5 goes from LOW to HIGH. As a result, a HIGH-level signal is sent to the D-flip-flop 7a and through the inverter 7d to the D-flip-flop 7b. Therefore, the D-flip-flop 7a outputs a HIGH-level set signal to the OR gate 7c. At the same time, the input level at the D-flip-flop 7b remains LOW. Therefore, the output level of the D-flip-flop 7b remains LOW. In response to the HIGH-level set signal from the D-flip-flop 7a, a HIGH-level signal is transmitted to the monostable multivibrator 8a by the OR gate 7c. As a result, the output level F at the inverted output terminal of the monostable multivibrator 8b goes LOW. Therefore, the input level at the reset terminals of the D-flip-flops 6a and 6b goes HIGH to reset the latter at the time $t_4$. On the other hand, at the same time, the output level at the non-inverted output terminal of the monostable multivibrator 8a goes HIGH to trigger the monostable multivibrator 8b. Therefore, the output G of the monostable multivibrator 8b, which serves as the read-enable pulse, goes HIGH.

Figure 2:
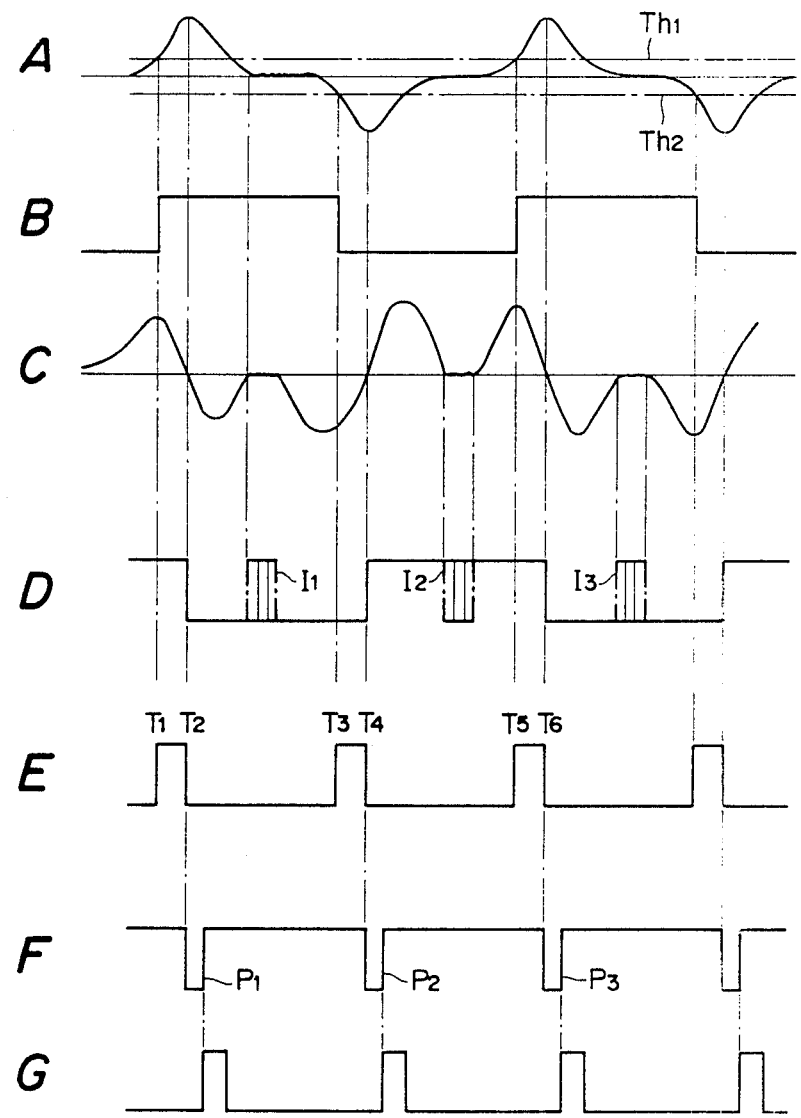
FIG. 2, consisting of A through G, is a timing chart of operation of the components in the preferred embodiment of the digital signal processing system of FIG. 1.

As shown in FIG. 2C, between the times $t_2$ and $t_3$, an inflection point appears in the reproduced signal A. This results in a zero-amplitude extremum in the differentiated signal C. This causes the zero-crossing comparator output D to go HIGH as indicated by phantom line $I_1$. However, at this time, since the D-flip-flops 7a and 7b are reset, they do not respond to the HIGH-level comparator signal D.

In the period $t_5$ to $t_6$, a read-enable pulse is again produced in substantially the same manner as disclosed with respect to the period $t_1$ to $t_2$. During the period between $t_4$ and $t_5$, another HIGH-level output $I_2$ of the zero-crossing comparator 5 appears but erroneous output of a read-enable pulse is successfully prevented.

As will be appreciated herefrom, by providing the hysteresis comparator 4 and the edge-detecting circuit 6, the influence of long intervals between magnetic medium reversals can be satisfactorily and successfully eliminated.

Therefore, the invention fulfills the objects and advantages sought therefor.

While the present invention has been disclosed in terms of the preferred embodiment of the invention in order to facilitate full understanding of the invention, the invention should not be understood as being limited to the specific embodiment shown above.

For example, the edge detector 6 is not always necessary for disabling the edge detector 7 but can be replaced with an appropriate gating means for passing and blocking the HIGH-level output of the OR gate 7c to the pulse generator circuit 8. Also, the pulse generator circuit 8 may comprise a single monostable multivibrator, in such case, the D-flip-flops 6a and 6b can be reset by the read-enable pulse therefrom. Furthermore, the D-flip-flops 6a and 6b can be replaced by an appropriate signal generator which generates a HIGH-level signal to release the D-flip-flops 7a and 7b from their reset state. This signal generator can be a monostable multivibrator which continuously outputs a HIGH-level signal for a given period after detecting variation of the reproduced signal level across one of the upper and lower threshold levels $Th_1$ and $Th_2$ as discussed previously. In addition, of the D-flip-flops 7a and 7b can be enabled and disabled by setting and resetting an enable flag by which the operation of the edge detector 7 is controlled, according to signal level variation of the reproduced signal and the presence or absence of the read-enable signal.

Therefore, the invention should be interpreted to include all possible embodiments and modifications of the shown embodiment which do not depart from the principles of the invention, which are set out in the appended claims.

What is claimed is:

1. A digital signal processing system for generating read-enable pulses comprising:
   a record medium for storing digital data;
   first means for reproducing a first signal representative of said stored ditigal data and which has a signal level varying according to the stored digital data;
   second means for monitoring said first signal and upon detecting a peak in said first signal, producing a read-enable pulse; and
   third means, cooperative with said second means, for monitoring said first signal level and enabling said second means to produce said read-enable pulses every time said first signal level crosses a predetermined threshold level, said third means being responsive to said second means producing said read-enable pulse to subsequently disable said second means until the next time said first signal level crosses said predetermined threshold level; wherein:

said second means comprises a differentiation circuit for producing a second signal indicative of the differentiated value of said first signal and a first detector means which produces a read-enable pulse upon detecting zero-crossing of said second signal;

said first detector means is enabled and disabled by said third means;

said third means comprises a second detector means having a second comparator continuously comparing said first signal level with said predetermined threshold level and enabling said second means to produce said read-enable pulse when said first detector means detects zero-crossing of said second signal;

said third means is disabled when said second means produces said read-enable signal until said second comparator detects that said first signal level has again crossed said predetermined threshold level;

said predetermined threshold level comprises a first positive threshold level and a second negative threshold level, and said second comparator switches its output level between HIGH and LOW levels each time said first signal level moves outside the range defined by said first and second threshold levels;

said second detector further comprises an enable signal generator for producing an enable signal enabling said second means at every occurrence of switching of said second comparator output level;

said first detector comprises a first comparator which switches its output level between HIGH and LOW levels at every occurrence of positive-going and negative-going zero-crossings of said second signal, and wherein said second means produces said read-enable pulse in response to every occurrence of switching of said first comparator output in the presence of said enable signal from said third means; and said enable signal generator comprises a first enable signal generator responsive to switching of said second comparator output from LOW level to HIGH level to produce said enable signal, and a second enabling signal gnerator responsive to switching of said second comparator output from HIGH level to LOW level to produce said enable signal, and wherein said enable signal from one of said first and second enable signal generators is transmitted to said second means through a second OR gate.

2. The system as set forth in claim 1, wherein said first detector further comprises a read-enable pulse generator, a first trigger signal generator responsive to switching of said first comparator output from LOW level to HIGH level to produce a trigger signal which triggers said read-enable pulse generator to produce said read-enable pulse, and a second trigger signal generator responsive to switching of said first comparator output from HIGH level to LOW level to produce said trigger signal, and wherein said trigger signal from one of said first and second trigger signal generators is transmitted to said read-enable pulse generator through a first OR gate.

3. The system as set forth in claim 2, wherein said read-enable pulse generator includes a disable signal generator for disabling said first and second enable signal generators in the presence of a read-enable pulse.

4. A digital signal processing system for reproducing a signal from a magnetic medium, said signal having been recorded on said magnetic medium with periodic magnetic reversals, and for further generating read-enable pulses, said system comprising:

reproducing means for reproducing said recorded signal;

hysteresis comparator means responsive to said reproducing means for comparing said reproduced signal with at least one threshold signal and generating an output when said reproduced signal exceeds said threshold signal;

differentiating means responsive to said reproducing means for differentiating said reproduced signal to produce a differentiated signal;

zero-crossing comparator means responsive to said differentiating means for detecting a zero-crossing of said differentiated signal and generating a comparator output signal;

first edge detector means responsive to said hysteresis comparator means for generating an enabling signal when said reproduced signal exceed said threshold signal;

second edge detector means enabled by said enabling signal and responsive to said comparator output signal for generating a gated signal; and pulse generating means responsive to said gated signal for generating read-enable pulses and reset pulses for resetting said first edge detector;

whereby response to said second edge detector to said comparator output signal is inhibited during extended intervals between said magnetic reversals and generation of spurious read-enable pulses during said extended intervals is prevented.

* * * * *